US006256977B1

(12) United States Patent
McGinley et al.

(10) Patent No.: US 6,256,977 B1
(45) Date of Patent: Jul. 10, 2001

(54) START CIRCUIT FOR ELECTRIC STARTING OF ENGINES

(75) Inventors: Ray McGinley, Fountain Hills; John Harvell, Phoenix; Robert C. Wagner, Fountain Hills, all of AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/391,329

(22) Filed: Sep. 7, 1999

(51) Int. Cl.[7] ...................................................... F02C 7/268

(52) U.S. Cl. ...................... 60/39.142; 244/53 A; 318/441

(58) Field of Search ...................... 60/39.142; 123/179.1; 244/53 A; 318/440, 441

(56) References Cited

U.S. PATENT DOCUMENTS

| | | | |
|---|---|---|---|
| 1,989,958 * | 2/1935 | Waters | 318/441 |
| 3,858,391 | 1/1975 | Davis et al. . | |
| 3,937,974 | 2/1976 | Lafuze . | |
| 4,456,830 | 6/1984 | Cronin . | |
| 4,494,372 * | 1/1985 | Cronin | 60/39.142 |
| 4,682,095 | 7/1987 | Shibata et al. . | |
| 4,896,637 | 1/1990 | Yamamoto . | |
| 5,055,764 | 10/1991 | Rozman et al. . | |
| 5,172,543 | 12/1992 | White . | |
| 5,281,905 | 1/1994 | Dhyanchand et al. . | |
| 5,442,272 | 8/1995 | Schwartz . | |
| 5,451,854 | 9/1995 | Uskoski . | |
| 5,844,384 | 12/1998 | Hamm et al. . | |
| 5,899,411 * | 5/1999 | Latos | 244/53 A |

FOREIGN PATENT DOCUMENTS 0 911 515 A1 4/1999 (EP) .

* cited by examiner

*Primary Examiner*—Louis J. Casaregola
(74) *Attorney, Agent, or Firm*—Robert Desmond, Esq.

(57) ABSTRACT

A start circuit controlled by an electronic control unit for providing power from one or both of a battery and TRU in parallel to a starter motor coupled to a gas turbine engine. The circuit includes contactors between the TRU and battery and a junction where the current from the TRU and battery combine. The circuit further includes two additional contactors in series between the junction and the starter motor. Voltage sensors and contactor position sensors are employed for diagnostics. A novel method of starting the engine using the start circuit contemplated by the present invention is also descibed. In this method, the start is initiated with power only from the battery. After a period of time power from the TRU is added. This method reduces the amplitude of the start motor inrush current, which has a beneficial reliability effect on the components of the start circuit.

10 Claims, 3 Drawing Sheets

START CIRCUIT FOR ELECTRIC STARTING OF ENGINES

TECHNICAL FIELD

This invention relates generally to circuits for controlling starting current to a motor, and particularly to a circuit for controlling starting current to a starter for a gas turbine engine as well as a method for starting such engines.

BACKGROUND OF THE INVENTION

An auxiliary power unit, (APU), is a type of gas turbine engine which is commonly mounted in aircraft and performs a number of different functions. These functions include providing secondary power to the aircraft as well as providing pressurized bleed air for main engine starting and the aircraft's environmental control system. Typically, APUs are started by a DC starter motor which is mounted on the APUs gearbox.

Referring to FIG. 1 which shows a prior art start circuit 10, electric starting of APUs in airplanes is often accomplished by providing DC power from two distinct sources in parallel. One source is an onboard APU battery 12 and the other source is DC power derived from AC generators through a transformer-rectifier unit 14, (TRU). When an APU start is initiated, commands from the aircraft control system close contactor 16 and starting current from the APU battery 12 and TRU 14 combine at junction 20 and then flow to the APU starter motor 26 provided contactors 2 and 24 are closed.

The operation of the circuit 10 is controlled by the APUs electronic control box, (ECB) 28. When the ECB 28 receives a command 50 from the aircraft to start the APU, it sends a close signal to contactors 22 and 24. Voltage sensors 32, 34, and 36 provide voltage signals to the ECB 28.

A disadvantage to this prior art circuit 10, is that when both the battery 12 and TRU 14 are operating, the combined inrush current is more than required to accelerate the APU. This occurs because the system is typically sized for battery only starting to assure that the APU can be started when the TRU is not operating. That is, for example, when the aircraft is on the ground and the main engines are shut down. Because the starter motor 26 is typically a series wound device, the combined power produces high inrush current at the inception of a start. This high inrush current can cause excessive heating of the starter motor, reduced life of the contactors, and reduced life of the APU gearbox due to the initial high impact torque generated by the starter motor.

Accordingly, there exists a need for a start circuit used in the electric starting of an APU aboard an aircraft that can mitigate high inrush current when starting power is being provided from a battery and TRU in parallel.

SUMMARY OF THE INVENTION

An object of the present invention is to provide a start circuit for electric starting of an onboard APU that mitigates high inrush current.

Another object of the present invention is to provide a start system that incorporates the start circuit contemplated by the present invention.

Another object of the present invention is to provide a method for starting an APU.

The present invention achieves these objects by providing a start circuit controlled by an electronic control box for providing power from one or both of a battery and TRU in parallel to a starter motor coupled to a gas turbine engine. The circuit includes contactors between the TRU and battery and a junction where the current from the TRU and battery combine. The circuit further includes two additional contactors in series between the junction and the starter motor. Voltage sensors and contactor position sensors are employed for diagnostics.

A novel method of starting the engine using the start circuit contemplated by the present invention is also descibed. In this method, the start is initiated with power only from the battery. After a period of time power from the TRU is added. By delaying the power from the TRU, high inrush current is avoided.

These and other objects, features and advantages of the present invention are specifically set forth in or will become apparent from the following detailed description of a preferred embodiment of the invention when read in conjunction with the accompanying drawings.

DESCRIPTION OF THE INVENTION

Figure 1:
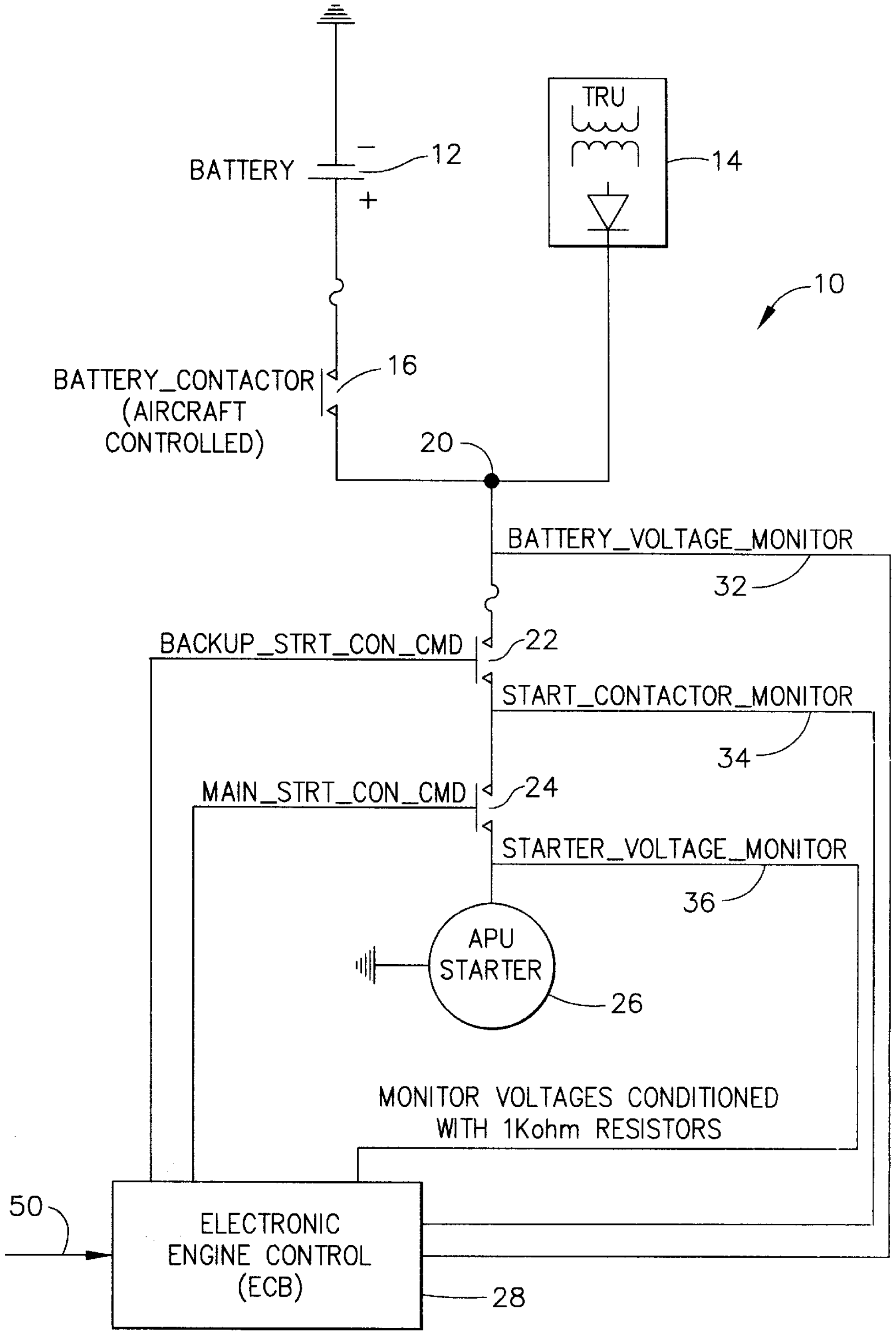
FIG. 1 (PRIOR ART)
FIG. 1 is a diagram of a prior art start circuit.
Figure 2:
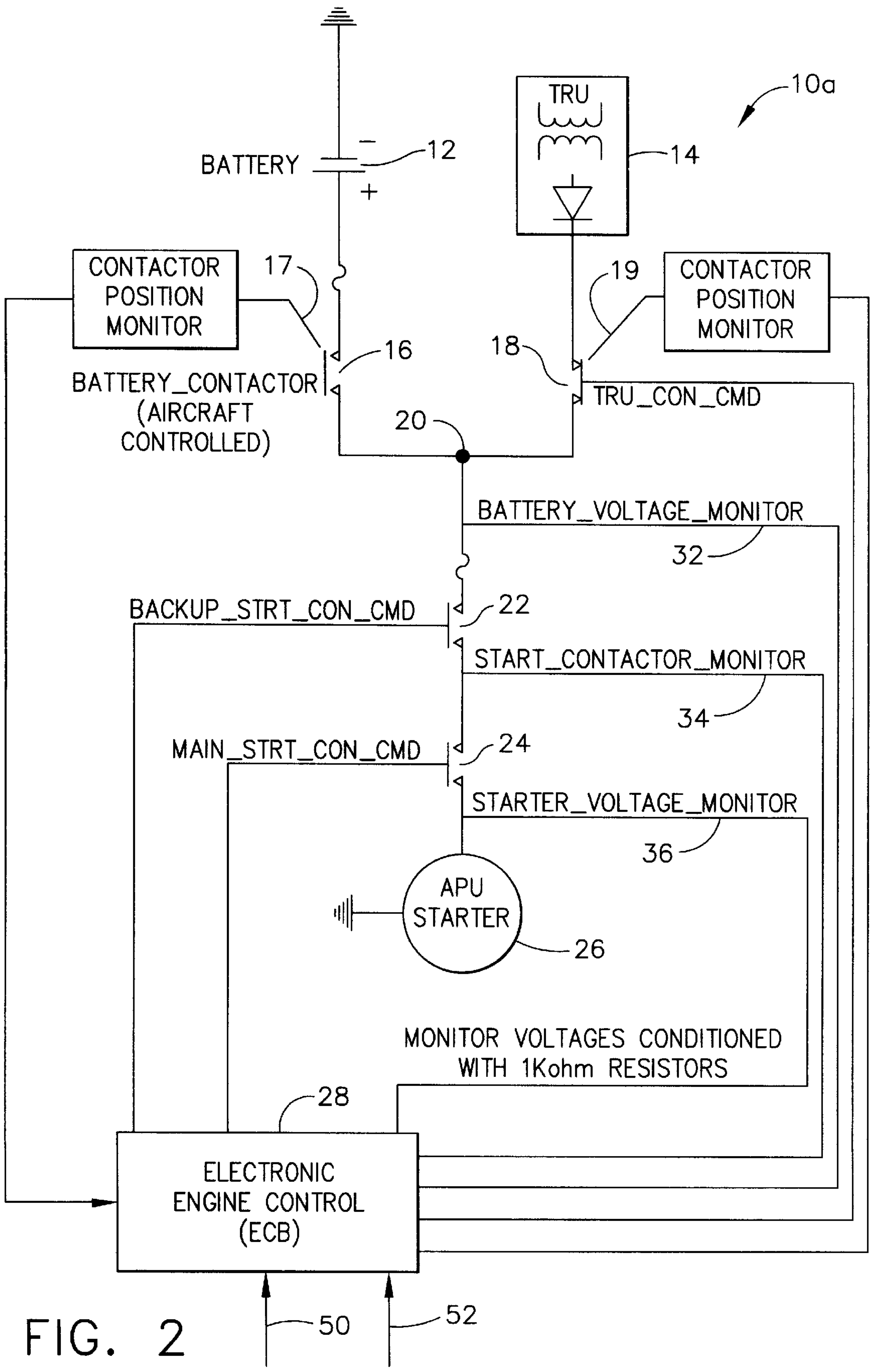
FIG. 2 is a diagram of a start circuit contemplated by the present invention.

FIG. 2 shows a start system 10*a* for a gas turbine engine such as an auxiliary power unit (APU) having an electronic control box 28 (ECB) that controls the operation of the system 10*a*. Included in the system 10*a* is an APU battery 12 in parallel with a transformer-rectifier unit 14, TRU. Current from both the battery 12 and TRU 14 are summed at junction 20. A contactor 16, is disposed between the battery 12 and the junction 20. Associated with the contactor 16 is a position sensor 17 that delivers to the ECB 28 a signal indicative of whether the contactor 16 is open or closed. Similarly, a contactor 18, which is controlled by the ECB 28, is disposed between the TRU 14 and the junction 20. Like contactor 16, contactor 18 has a position sensor 19 that delivers to the ECB 28 a signal indicative of whether the contactor 18 is open or closed.

Starting from the junction 20, the system 10*a* further includes in series a voltage sensor 32, a contactor 22, a voltage sensor 34, a contactor 24, a voltage sensor 36 and finally a starter motor 26. Each of the voltage sensors 32, 34, 36 sends a signal to the ECB 28 and each of the contactors 22 and 24 is controlled by the ECB 28. In a manner familiar to those skilled in the art, the starter motor 26 is mechanically coupled to the APU and provides motive power to the APU for starting.

The following describes an APU start sequence with the start system 10*a* where both the battery 12 and TRU 14 are producing power. The ECB 28 receives a start signal 50 from the aircraft, usually the pilot pushing a start switch in the cockpit as well as a signal 52 indicative of the APU's rotational speed. The ECB 28 acknowledges the start command and generates a start-in-progress command signal. In response to this command signal, contactor 16 closes and contactor 18 is commanded open while contractors 22 and 24 remain open. The ECB 28 then tests to see if the battery 12 is online by verfying that there is voltage at sensor 32 and that the signal from the position sensor 17 indicates the closed position of contactor 16. The ECB also tests to see if contactor 18 is operating properly by looking at the signal from the position sensor 19. If this signal indicates that the contactor 18 is welded closed, i.e. not responding to the open command, the start may be aborted. In addition the ECB 28 will send a signal to the aircraft control system that there is a malfunction in contactor 18. A half second after these tests are completed, the ECB 28 commands contactor 22 closed. Again the postion of contactor 18 is verified to be open. If it is closed the start is aborted and a malfunction signal is sent to the aircraft control system. One and half seconds later, contactor 24 is closed and power is delivered to the starter motor 26. After the APU reaches about 5 percent of operating rotational speed, contactor 18 is closed and the TRU comes on line. By delaying the TRU from coming online, the problem of high inrush current is eliminated in a manner familiar to those skilled in the art. At a predetermined cutout engine speed, contactors 22 and 24 are opened, and the APU accelerates under its own power.

The ECB 28 uses voltage sensors 32, 34, and 36 for diagnostics of contactors 22 and 24. If there is voltage at 32 but not at 34, a malfunction signal is sent to the aircraft indicating a problem with contactor 22. If there is voltage at sensor 34 but none at sensor 36 a malfunction signal is generated indicating a malfunction of contactor 24. Also, if upon the closing of contactor 16 voltage is sensed at sensor 34, this indicates that contactor 22 is welded closed. Likewise, if upon the closing of contactor 22, voltage is sensed at sensor 36 this indicates that contactor 24 is welded closed. In both cases a malfunction signal is generated that identifies the particular contactor experiencing the malfunction. Thus the system can identify which contactor is malfunctioning.

Figure 3:
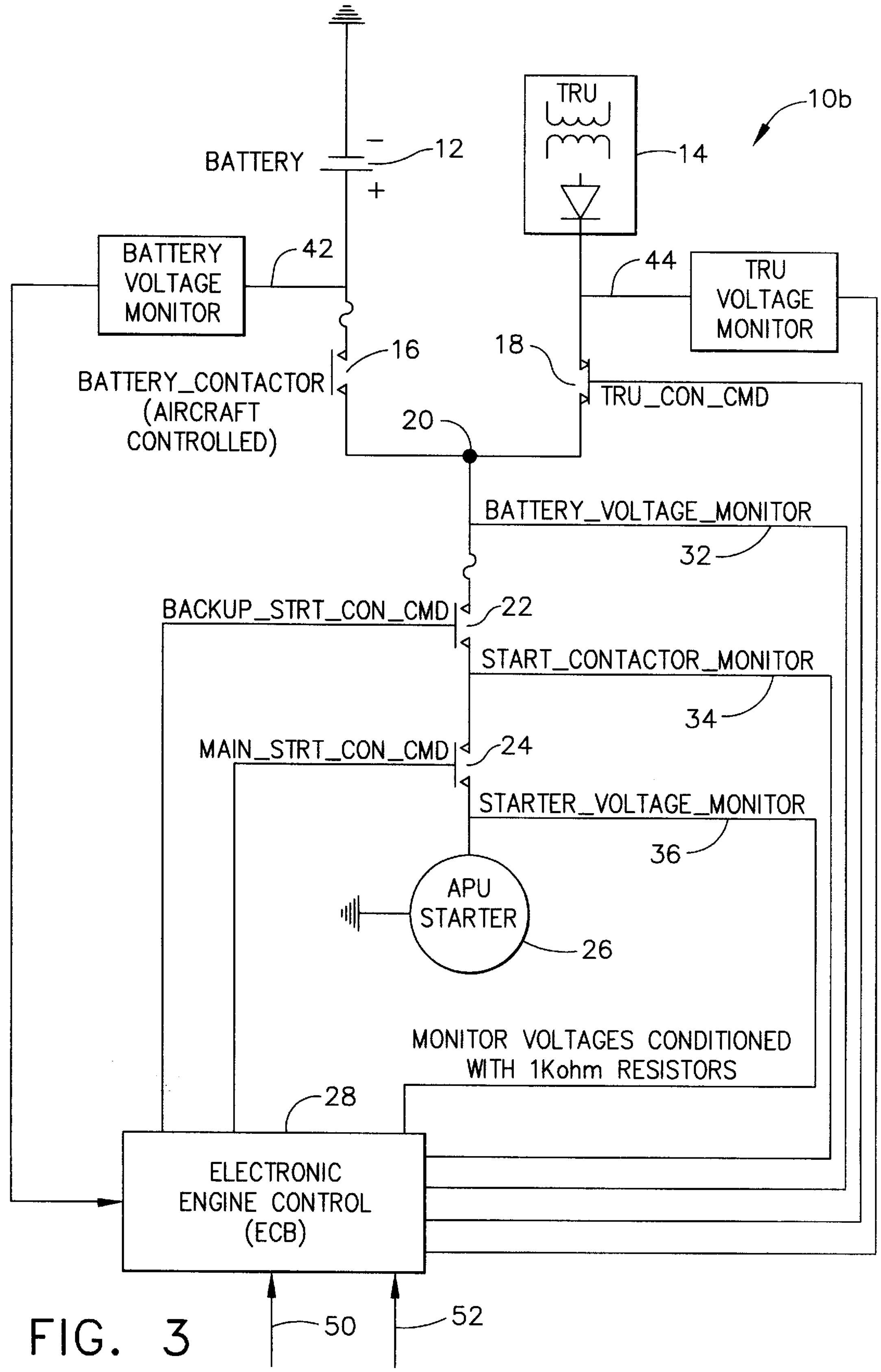
FIG. 3 is a diagram of an alternative embodiment of the start circuit of FIG. 2.

Referring to FIG. 3, an alternative circuit 10*b* does not have position sensors 17 and 19. Instead, a voltage sensor 42 is disposed between contactor 16 and the battery 12 and is used to sense when the battery is online. Similarly, a voltage sensor 44 is disposed between the TRU 14 and contactor 18 and is used to verify that the TRU is online.

Thus a start circuit and system and method therefor is provided that eliminates the problem of high inrush current as well has having improved diagnostic capability.

Though the invention has been described with respect to the starting of an onboard APU, it should be appreciated that the start circuit and system contemplated by the present invention can be used with any engine electric start system where active inrush current control is required. Accordingly, these descriptions of the invention should be considered exemplary and not as limiting the scope and spirit of the invention as set forth in the following claims.

What is claimed is:

1. A start circuit controlled by an electronic control box for providing power from one or both of a battery and TRU in parallel to a starter motor, said circuit comprising:

a first contactor in parallel with a second contactor, said first and second contactors being controlled by said electronic control box;

a junction for summing the current through said first contactor and said second contactor;

a third and fourth contactor in series and disposed between said junction and said starter motor, said third and fourth contactors being controlled by said electronic control box;

a first voltage sensor disposed between said junction and said third contactor, said first voltage sensor delivering a voltage signal to said electronic control box;

a second voltage sensor disposed between said third contactor and said fourth contactor, said second voltage sensor delivering a voltage signal to said electronic control box; and a third voltage sensor disposed between said fourth contactor and said starter motor, said third voltage sensor delivering a voltage signal to said electronic control box.

2. The circuit of claim 1 further comprising a fourth voltage sensor disposed between said battery and said first contactor, said fourth voltage sensor delivering a voltage signal to said electronic control box.

3. The circuit of claim 2 further comprising a fifth voltage sensor disposed between said TRU and said second contactor, said fifth voltage sensor delivering a voltage signal to said electronic control box.

4. The circuit of claim 1 wherein said first contactor includes a first position sensor for commincation to said Electronic Control Box the position of said first contactor.

5. The circuit of claim 4 wherein said second contactor includes a second position sensor for commincation to said Electronic Control Box the position of said second contactor.

6. A system for electrically starting an engine comprising:

a battery in parallel with a transformer-rectifier unit;

a junction for summing the current from said battery and said TRU;

a starter motor for providing motive power to said engine;

a first contactor disposed between said battery and said junction;

a second contactor disposed between said TRU and said junction;

a third and fourth contactor in series and disposed between said junction and said starter motor;

a first voltage sensor disposed between said junction and said third contactor, a second voltage sensor disposed between said third contactor and said fourth contactor;

a third voltage sensor disposed between said fourth contactor and said starter motor; and an electronic control box for receiving signals from said voltage sensors and in response thereto selectively opening and closing said contactors.

7. The system of claim 6 further comprising a fourth voltage sensor disposed between said battery and said first contactor, said fourth voltage sensor delivering a voltage signal to said electronic control box.

8. The system of claim 7 further comprising a fifth voltage sensor disposed between said TRU and said second contactor, said fifth voltage sensor delivering a voltage signal to said electronic control box.

9. The system of claim 6 wherein said first contactor includes a first position sensor for communication to said Electronic Control Box the position of said first contactor.

10. The system of claim 9 wherein said second contactor includes a second position sensor for communicating to said Electronic Control Box the position of said second contactor.

* * * * *